United States Patent Office 3,150,620
Patented Sept. 29, 1964

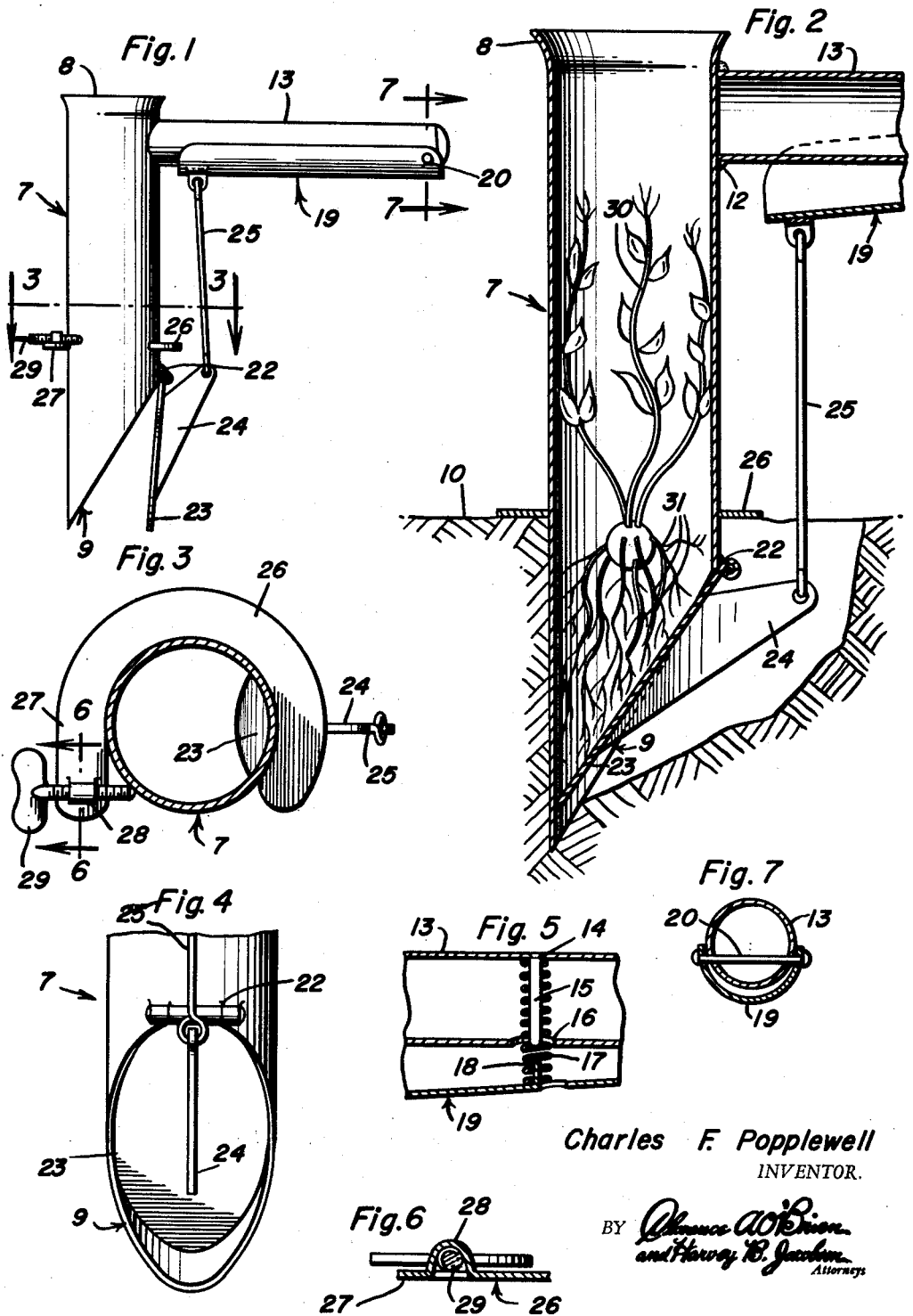

3,150,620
PLANT SETTER
Charles F. Popplewell, Church Rock, N. Mex., assignor of eighty-five percent to Inter-Denominational Holiness Indian Missions, Inc., Church Rock, N. Mex., and fifteen percent to Lovice S. Jack, San Jose, Calif.
Filed Oct. 12, 1962, Ser. No. 230,113
2 Claims. (Cl. 111—4)

This invention relates to new and useful improvements in plant setters of the type comprising a control valve, and has for one of its important objects to provide, in a manner as hereinafter set forth, an instrument of this character comprising unique operating means for the valve.

Another highly important object of the present invention is to provide a plant setter of the aforementioned character which embodies unique depth regulating means.

Still another important object is to provide an implement of the character described which is adapted to set the plants with the roots uncrowded and in a natural position free to spread, thus promoting growth and health.

Other objects of the invention are to provide a plant spreader which is comparatively simple in construction, strong, durable, compact, of light weight, efficient and reliable in use and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a plant setter constructed in accordance with the present invention, showing the valve in open position;

FIGURE 2 is a vertical sectional view, showing the implement in use;

FIGURE 3 is a view in horizontal section on an enlarged scale, taken substantially on the line 3—3 of FIGURE 1;

FIGURE 4 is a fragmentary view in rear elevation of the lower portion of the device;

FIGURE 5 is a fragmentary view in vertical longitudinal section through an intermediate portion of the handle showing the valve closing means;

FIGURE 6 is a detail view in vertical section on an enlarged scale through the depth gauge adjusting means, taken substantially on the line 6—6 of FIGURE 3; and FIGURE 7 is a detail view in cross section on an enlarged scale through the free end portion of the handle, taken substantially on the line 7—7 of FIGURE 1.

Referring now to the drawing in detail, it will be seen that the embodiment of the invention which has been illustrated comprises a cylindrical tube of suitable metal or other material which is designated generally by reference numeral 7. The tube 7, which may be of any desired dimensions, is open at both ends and includes a flared upper end portion or mouth 8. The tube 7 further includes a beveled lower end portion 9 which facilitates penetrating the soil, as indicated at 10.

Affixed horizontally, as at 12, to the upper portion of the tube 7 and projecting rearwardly therefrom is a tubular horizontal handle 13. Mounted vertically in the tubular handle 13 at an intermediate point and fixedly secured in an opening 14 provided therefor in the upper portion of said handle is a guide pin 15. Below the pin 15 the lower portion of the handle 13 has formed therein an opening 16. The opening 16 receives therethrough a coil spring 17 which encircles the pin 15 in the handle 13.

The lower end of the coil spring 17 is engaged with an apertured ear or lug 18 which is struck upwardly from an intermediate portion of a hand or squeeze lever 19. The lever 19 is of arcuate cross section to nestingly receive the handle 13, beneath which said lever is mounted. The lever 19 is pivotally secured for vertical swinging movement beneath the handle 13 by a pin 20 which, it will be noted, is engaged in the outer end portions of said lever and said handle.

Hingedly suspended at 22 for swinging movement in a vertical plane on the lower portion 9 of the tube 7 and engageable therein is a valve 23. An upwardly and rearwardly inclined operating arm 24 is affixed to the back of the valve 23. A link 25 operatively connects the free forward end of the lever 19 to the arm 24.

A generally C-shaped depth gauge 26 of suitable metal or other material is removably and vertically adjustably mounted on the tube 7. The gauge 26 includes a straight end portion 27 having struck upwardly therefrom a longitudinal loop or the like 28. The adjacent portions of the loop 28 and the portion 27 of the gauge 26 are threaded to receive a securing screw 29 of the wing type. The screw 29 is engageable with the tube 7 for securing the gauge in adjusted position thereon.

It is thought that the use of the implement will be readily apparent from a consideration of the foregoing. Briefly, the valve 23 is normally maintained in a closed position by the coil spring 17, said spring yieldingly urging the lever 19 downwardly for engaging said valve in the lower portion 9 of the tube 7 through the medium of the link 25. The tube 7 is driven downwardly in the soil 10 to the desired depth as determined by the adjustable gauge 26. The plant to be set, as indicated at 30, is then dropped into the tube 7 through the flared upper end portion 8 thereof, the roots 31 of said plant resting on the valve 23. Through the medium of the fingers of the hand which grips the handle 13, the trigger or lever 19 is then squeezed or actuated against the tension of the coil spring 17 for opening the valve 23 thus permitting the plant to drop into the soil. With the valve 23 still in open position, the implement is then lifted, leaving the plant in the soil in an obvious manner. As the implement is thus raised, the loose soil comes in around the plant and the setting operation is completed. The plant is thus set with the roots thereof in a natural, uncrowded position. Also, the roots are set in moist soil and a minimum of dry soil falls to the roots where it is quickly moistened. By adjusting the gauge 26 vertically on the tube 7, the depth at which the plant is set may be regulated as desired. It will be observed that the construction and arrangement is such that when the valve 23 is opened the soil is pushed away from the seat or lower end 11 of the tube 7.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plant setter comprising an elongated open-ended tube of substantially constant cross-sectional area throughout its length and having an outwardly flared upper end for receivng plants without damage to the root systems thereof, the lower end of said tube being bevelled thereby defining a lower end having an upper portion and a lower portion, a closure plate for the lower end of the tube, hinge means securing the plate to the upper portion of the lower end of the tube on the exterior surface thereof thereby eliminating any projections into the interior of the tube, said plate forming a closure for the lower end of the tube with the free end thereof adapted to engage the inner surface of the lower portion of the lower end of the tube when in closed position thereby preventing entry of dry soil into the tube during insertion of the tube into the soil surface, a laterally extending vertically disposed plate attached to the outer surface of the closure plate, a link pivotally attached to the outer end of said laterally extending plate with the link being disposed generally parallel to the tube and spaced laterally therefrom, a laterally extending handle attached to the tube adjacent the upper end thereof and extending to the same side of the tube as the laterally extending plate attached to the closure plate, a lever underlying the handle for a substantial portion of its length, pivot means interconnecting the outer end of the lever and the outer end portion of the handle, the inner end of the lever being attached to the upper end of the link for pivotal movement in relation thereto whereby pivotal movement of the lever towards and away from the handle will cause swinging movement of the closure plate from a closed position to an open position in substantial alignment with the portion of the peripheral wall of the tube having the closure plate hinged thereto thereby providing an unobstructed discharge area for the root system of a plant, spring means interposed between the handle and the lever intermediate the ends of the lever for biasing the lever downwardly thus retaining the closure plate normally in closed position and adjustable depth gauge means mounted on said tube for limiting the penetration of the tube into the soil surface.

2. The plant setter as defined in claim 1 wherein said depth gauge means includes a plate having a substantially U-shaped recess therein for receiving the tube, said recess extending peripherally of the tube to an extent greater than one-half of the circumference of the tube, one edge of the recess conforming with the peripheral surface of the tube and the other edge thereof extending tangentially from the opposite edge of the tube, said depth gauge including an integrally formed loop on the portion thereof which extends tangentially, and a screw-threaded member extending through the loop in parallel relation to the depth gauge and generally tangential to the tube in perpendicular relation to the tangential edge portion of the depth gauge for engaging the tube and retaining the tube and depth gauge in adjustable interlocked connection.

References Cited in the file of this patent

UNITED STATES PATENTS

| | | |
|---|---|---|
| 323,419 | Hiller | Aug. 4, 1885 |
| 699,556 | Olinger | May 6, 1902 |
| 909,289 | Grisell | Jan. 12, 1909 |
| 954,576 | Logan | Apr. 12, 1910 |
| 1,794,976 | Mueller | Mar. 3, 1931 |
| 2,529,336 | Henderson | Nov. 7, 1950 |
| 2,656,071 | Smith | Oct. 20, 1953 |
| 2,749,068 | Wayman | June 5, 1956 |
| 2,860,586 | Nozell | Nov. 18, 1958 |
| 2,865,314 | Landin | Dec. 23, 1958 |

FOREIGN PATENTS

| | | |
|---|---|---|
| 204,216 | Great Britain | Sept. 27, 1923 |
| 559,993 | Italy | Mar. 28, 1957 |

OTHER REFERENCES

Apl. S. #D14445, Germany, Dec. 13, 1956.